United States Patent

Wahl et al.

[15] 3,640,415
[45] Feb. 8, 1972

[54] INDUSTRIAL VEHICLE

[72] Inventors: James A. Wahl, Langhorne; Robert A. Nieminski, Philadelphia, both of Pa.

[73] Assignee: Eaton Yale & Towne, Inc., Cleveland, Ohio

[22] Filed: May 1, 1970

[21] Appl. No.: 33,611

[52] U.S. Cl.........................................................214/672
[51] Int. Cl..........................................................B65g 7/00
[58] Field of Search..................214/640, 670, 672, 673, 674, 214/652; 187/9; 180/50

[56] References Cited

UNITED STATES PATENTS

| | | | |
|---|---|---|---|
| 2,855,119 | 10/1958 | Arnot | 214/672 |
| 3,016,987 | 1/1962 | Williamson | 180/50 |
| 3,064,745 | 11/1962 | Colt et al. | 180/6.24 |

*Primary Examiner*—Gerald M. Forlenza
*Assistant Examiner*—Lawrence J. Oresky
*Attorney*—Teagno & Toddy

[57] ABSTRACT

An industrial lift vehicle includes a driving portion and a load lifting portion. The load lifting portion includes a ground engaging outrigger which is pivotally connected to the driving portion about a horizontal axis. The load lifting portion includes a vertically extending mast structure mounted on the outrigger for pivotal movement therewith with respect to the driving portion. Means are provided on the driving portion and the mast structure for permitting articulation of the load mast and outrigger with respect to the driving portion about the horizontal axis while preventing movement of the mast structure with respect to the driving portion about another horizontal axis located transversely to the above horizontal axis.

3 Claims, 3 Drawing Figures

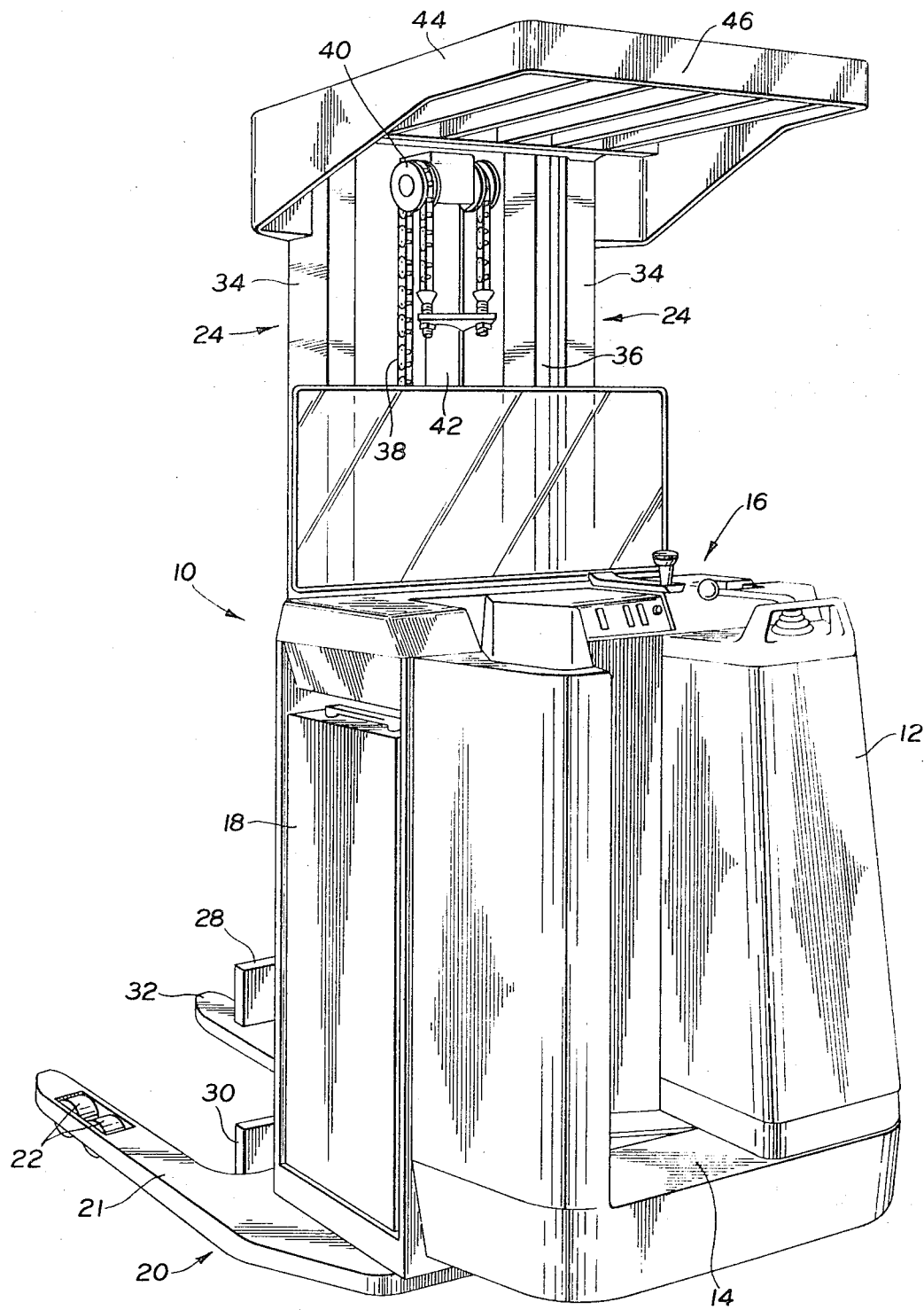

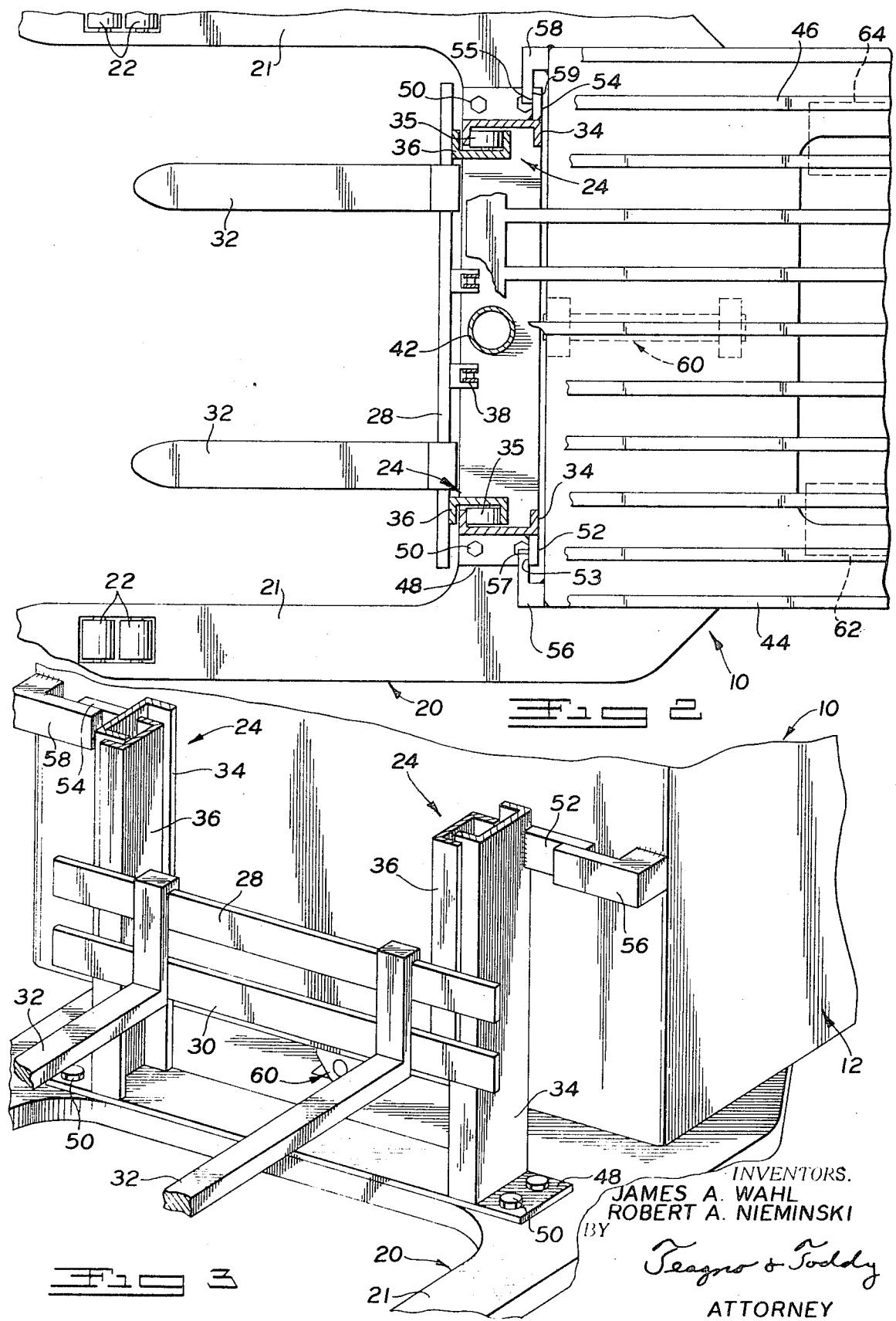

INDUSTRIAL VEHICLE

BACKGROUND OF THE INVENTION

1. Field of Invention

This invention relates to an industrial lifting vehicle and more particularly to an industrial lifting vehicle of the type in which the load carrying portion is articulated about a horizontal axis with respect to the driving portion of the vehicle.

2. Discussion of the Prior Art

As is known, industrial lift vehicles operate generally within warehouses on runways and other prepared surfaces wherein an attempt has been made to control the levelness of the surface over which the vehicle must operate. However, it is not practical to expect that every surface over which an industrial vehicle operates will be precisely level or free of surface defects. As it is axiomatic that three points on a surface define a plane, attempts have been made in the prior art to provide articulation among the various ground engaging wheels so as to permit support of the lifting vehicle by the largest number of ground engaging wheels as is possible. Articulation between the lifting and steering portions of a vehicle is a method of accomplishing this desired stability.

One form of articulation to accomplish this function is shown in U.S. Pat. No. 2,804,174 issued Aug. 27, 1957 to A. R. Chasar where in FIG. 1 it is shown that each of the outriggers 5 are pivotally mounted to the frame of the industrial vehicle so as to permit articulation of the outrigger extensions with respect to the main frame of the vehicle.

Another prior art device which permits articulation of certain of the ground engaging wheels with respect to another portion of the vehicle in U.S. Pat. No. 3,031,024 issued Aug. 24, 1962 to B. I. Ulinski, wherein the driving and steering wheels 33 are mounted on a walking beam for pivotal movement about a horizontal axes 25.

Still another prior art vehicle is disclosed in U.S. Pat. No. 2,855,119 issued Oct. 7, 1958 to A. E. R. Arnot. In the Arnot patent, the load carrying and lifting portion of the vehicle 11 is articulated with respect to the driving and steering portion 12 about a horizontal axis 14. The Arnot patent contains disclosure relevant to the invention of the present application.

In the Arnot reference, articulation is permitted between the lifting portion of the vehicle and the driving portion 12 of the vehicle about the horizontal pivotal connection 14. The tipping moment due to a load being lifted on the lifting portion 11 which tends to tip the mast structure with respect to the driving and steering portion 12 is also taken through the pivotal connection 14.

SUMMARY OF THE INVENTION

The invention of the present application accomplishes the functions of the Arnot disclosure in a much simpler and more direct manner.

The axis of articulation in the vehicle of the present invention is located more closely to the ground surface over which the vehicle must travel, thereby permitting a much more efficient and effective articulation of the load lifting portion of the vehicle with respect to the driving and steering portion.

Further in the present invention the horizontal pivotal connection permitting articulation between the load lifting portion and the driving and steering portion of the vehicle is not expected to take any of the moment created by the lifting of a load along the mast of the lifting portion of the vehicle. Special bearing means are provided in association with the mast located on the lifting portion of the vehicle at a point well spaced from the axis of articulation to react this tipping moment. The mounting of the mast structure on the load lifting portion of the vehicle and the use of the special bearing means also permits relatively quick and easy interchange of mast structures in accordance with the desires of the vehicle owner.

BRIEF DESCRIPTION OF THE DRAWINGS

FIG. 1 is a rear perspective view of the industrial vehicle to which the invention of the present application is particularly adapted.

FIG. 2 is a top view of the industrial vehicle of FIG. 1 further illustrating the industrial vehicle in greater detail and illustrating certain features of the invention of the present application.

FIG. 3 is a partial front perspective of the industrial vehicle with certain portions of the lifting mechanism removed so that further features of the present invention may be disclosed.

DESCRIPTION OF A PREFERRED EMBODIMENT

In FIG. 1 there is shown an industrial lifting vehicle 10 of a highly maneuverable type generally referred to in the art as a narrow aisle truck or warehouser. The vehicle 10 comprises a driving and steering portion 12 which includes an operator's platform or compartment 14 together with the controls 16 necessary to control the lifting, steering and other operating functions of the vehicle 10. The vehicle 10 shown is an electrically driven vehicle which includes an electrical power source in the form of batteries located within a battery chamber 18.

The vehicle 10 further includes a generally U-shaped outrigger 20, only a portion of which may be seen in FIG. 1, but to which further reference will be made with regard to the remaining figures of the drawing.

Located near the outer ends of the outrigger are nonpowered load supporting casters 22. Rigidly affixed to the outrigger 20 is a vertically extending mast assembly 24 which is adapted to support a movable load carriage assembly 26 for powered vertical movement therealong. The movable load carriage assembly 26 includes fork support members 28 and 30 and a pair of generally horizontally extending load supporting forks 32, only one of which is shown in FIG. 1, but to which further reference will be made in the remaining figures of the drawing.

The mast assembly 24 includes a first, fixed generally C-shaped channel member 34 and a second movable generally C-shaped channel 36. The movable channel 36 is attached to the fork support bars 28 and 30 and moves in response to power supplied by an hydraulic ram assembly not completely shown in FIG. 1 through the intermediary of a chain 38 which is attached to the movable mast section 36 and which passes over a chain pulley 40 and is fixed to a nonmovable post member 42, which forms the cylinder of the hydraulic ram, located generally centrally of the mast assembly 24. Secured to the first nonmovable mast section 34 is an overhead operator guard 44 which includes a plurality of generally parallel bar members 46.

Referring now to FIG. 2 which is a top view of the industrial lift vehicle 10, it can be seen that the industrial vehicle 10 includes a pair of load-engaging forks 32 and that the outrigger comprises a generally U-shaped member having a pair of outwardly extending legs 21 having ground engaging casters 22 thereon. It can also be seen in FIG. 2 that the mast assembly 24 comprising the fixed channel member 34 and the movable channel member 36 are nested and separated for relative movement by a roller means 35. The fixed upright channel member 34 is secured to a plate member 48 which is secured to the outrigger 20 by bolts 50 or other suitable removable fastening means. Also shown in FIG. 2 are a pair of tab members 52 and 54. The tab member 52 defines a vertical bearing face 53 and is secured to the fixed channel member 34 on the left-hand side of FIG. 2 and extends generally outwardly therefrom. The tab member 54 defines a vertical bearing face 55 and is rigidly secured to the fixed channel member 34 on the right-hand side of FIG. 2 and extends generally outwardly therefrom. In sliding engagement with the bearing face 53 of tab member 52 is a generally L-shaped member 56 which defines a vertical bearing face 57 and which is rigidly secured to the frame of the driving and steering portion 12 of the vehicle 10. Located on the opposite side of the vehicle and in sliding engagement with the tab member 54 is a second generally L-shaped member 58 which defines a vertical bearing face 59 and which is similarly rigidly attached to the frame of the driving and steering portion 12 of the vehicle 10.

Shown in FIG. 2, and better illustrated in FIG. 3, is a horizontal pivot connection 60 interconnecting the frame of the driving and steering portion 12 and the outrigger 20 of the vehicle 10. The horizontal pivotal connection 60 lies along the forward-reverse axis of the vehicle 10 and is located vertically near the upper surface of the outrigger 20. Also seen in FIG. 2 is that the vehicle 10 is provided with a pair of driving and steering wheels 62 and 64 for propelling the vehicle 10 along a ground surface.

Referring now to FIG. 3 wherein the hydraulic mechanism 42 for raising the movable channel member 36 and the load fork 32 have been removed for purposes of a clearer disclosure of the features of the present invention. It may be seen that articulation is permitted between the driving and steering portion 12 and the outrigger 20 of the vehicle 10 in response to undulations or variations in the level of the surface over which the vehicle 10 is being driven. The effect of a variation in the level of the surface over which the vehicle 10 passes may be illustrated by reference to FIG. 3. The pivotal interconnecting means 60 permits articulation between the driving and steering portions 12 and the outrigger 20 at a vertical height near the upper surface of the outrigger. The bearing surfaces 53, 57 and 55, 59 of the outwardly extending tabs 52 and 54 and the cooperating L-shaped elements 56 and 58 permit free articulation of the mast assembly 24 with the outrigger 20 with respect to the driving and steering portion 12 of the vehicle 10 about the pivotal connection 60.

In addition, it may be seen by reference to FIGS. 2 and 3 that the outwardly extending tab members 52 and 54 cooperate with the respective L-shaped members 56 and 58 to react a moment generated in the mast structure 24 by a load present on the load supporting forks 32. Thus although the mast structures 24 and outrigger 20 are freely articulable about the pivotal interconnection 60, the driving and steering portion 12 remains available as a fully effective counterweight for any load being lifted on the load supporting forks 42.

We claim:
1. An industrial lifting vehicle comprising:
a driving and steering portion including a frame;
an outrigger assembly pivotally connected to the frame of the driving and steering portion for articulation about a horizontal axis extending front to rear of the vehicle;
a load lifting assembly including a vertically extending mast structure fixedly attached to the outrigger assembly; and
interengaging means vertically spaced upwardly from the pivotal connection between the driving and steering frame and the outrigger and operatively associated with the mast structure for permitting articulation of the frame and the outrigger about the pivotal connection and for preventing movement of the mast structure relatively to the frame about a second horizontal axis transverse to the axis of the pivotal connection, due to a load carried by said mast structure.
2. An industrial lifting vehicle as defined in claim 1 wherein:
the pivotal connection between the frame and the outrigger is vertically located near a horizontal plane defined by the outrigger; and
the means permitting articulation while preventing movement about a transverse horizontal axis is substantially spaced vertically from the pivotal connection.
3. The industrial lifting vehicle as defined in claim 2 wherein the means permitting articulation about the pivotal connection while preventing movement of the mast structure about a horizontal axis transverse to the pivotal connection comprise:
a tab member secured to the mast structure and including a vertical bearing surface thereon; and
a support member secured to the frame adapted to cooperate with the tab member, the support member including a vertical bearing surface thereon for sliding engagement with the vertical bearing surface of the tab member.

* * * * *